Figure 1:
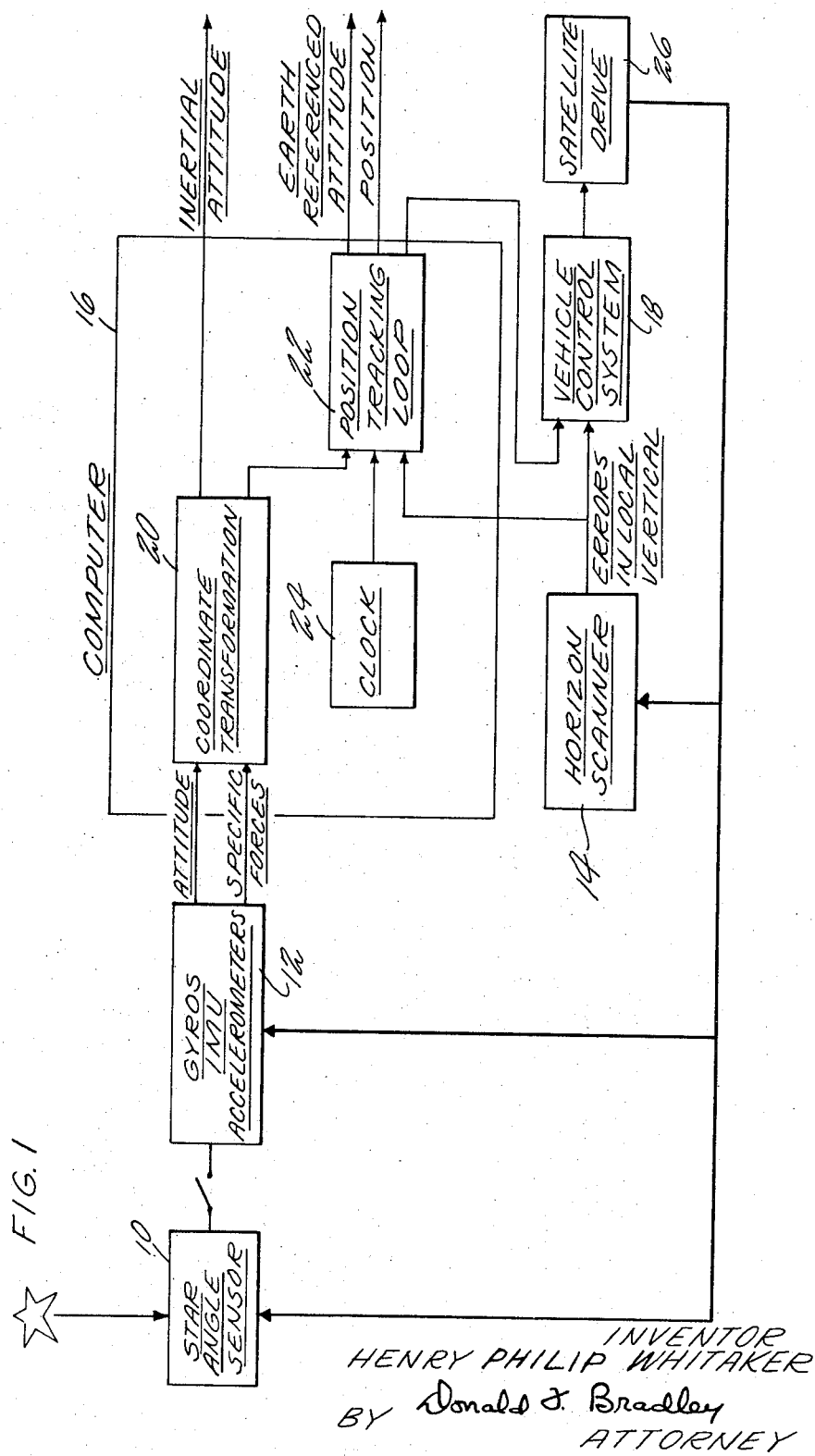

INVENTOR
HENRY PHILIP WHITAKER
BY Donald J. Bradley
ATTORNEY

Oct. 31, 1967
H. P. WHITAKER
ADAPTIVE ORBITAL CONTROL SYSTEM FOR SATELLITE NAVIGATION
Original Filed Sept. 28, 1962
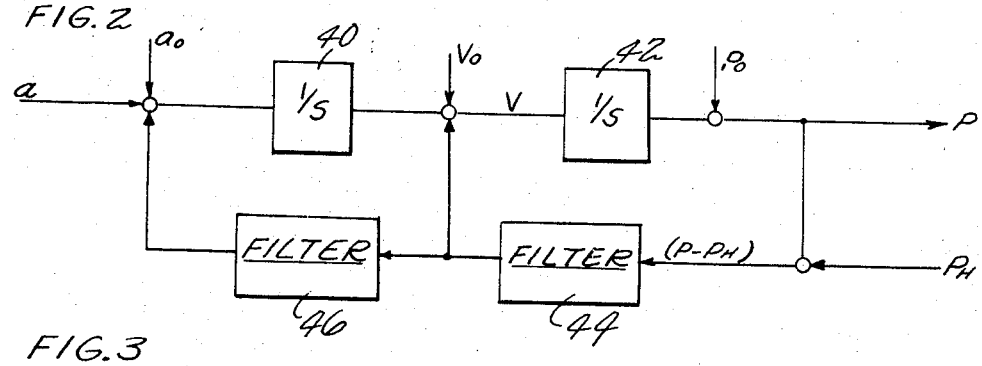
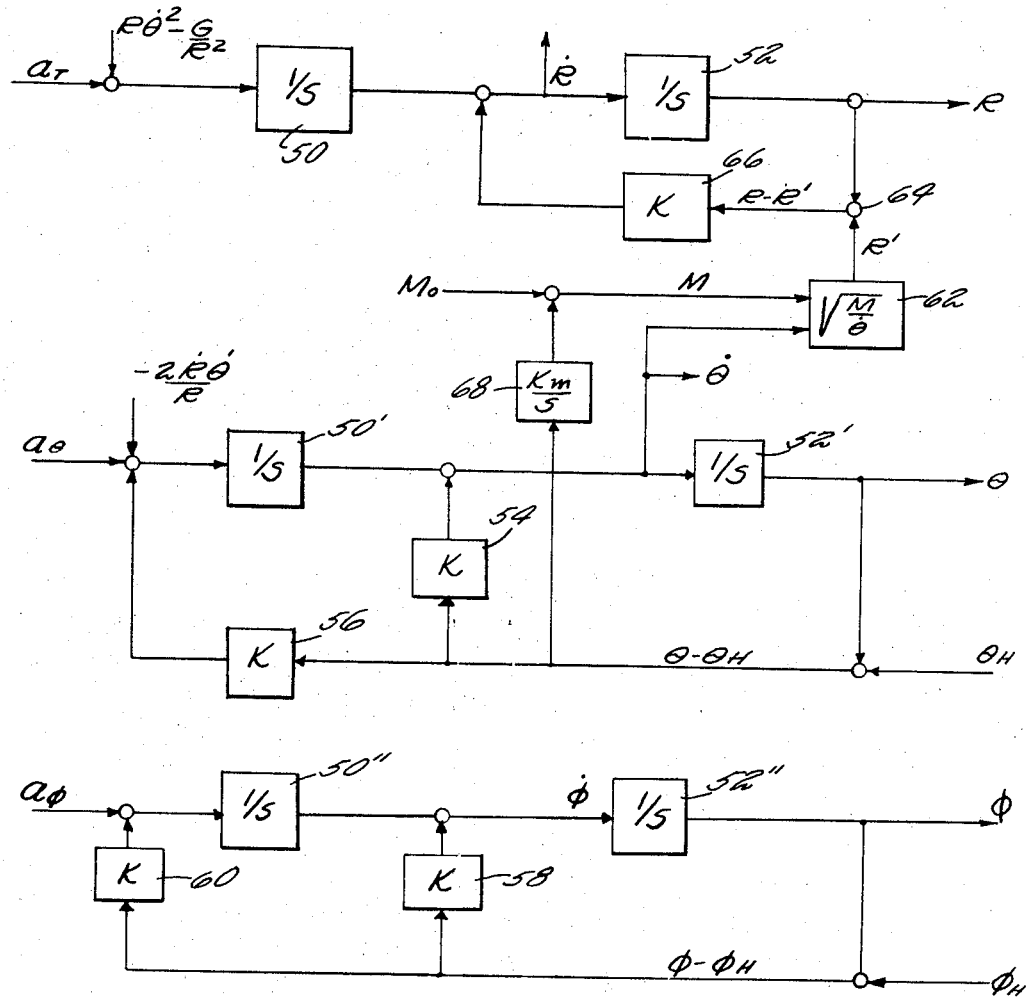

United States Patent Office 3,350,548
Patented Oct. 31, 1967

3,350,548
ADAPTIVE ORBITAL CONTROL SYSTEM FOR SATELLITE NAVIGATION
Henry Philip Whitaker, Framingham, Mass., assignor to United Aircraft Corporation, East Hartford, Conn., a corporation of Delaware
Continuation of application Ser. No. 226,199, Sept. 28, 1962. This application June 17, 1966, Ser. No. 559,677
8 Claims. (Cl. 235—150.1)

This is a continuation application of U.S. patent application Serial No. 226,199, filed September 28, 1962, now abandoned, for improvements in "Adaptive Orbital Control System for Satellite Navigation," by Henry Philip Whitaker.

This invention relates to a space navigation system, and particularly to a stellar-inertial guidance system which will provide a continuous precise knowledge of position and attitude with respect to the earth or other body of a satellite in orbit.

Copending patent application Serial No. 115,867 entitled "Guidance System," filed June 7, 1961, now Patent No. 3,301,508, by Joseph Yamron and assigned to the same assignee, discloses a stellar-inertial guidance system which provides an extremely accurate, fast response guidance and control system for use with all types of ballistic missiles. The basic concept of the copending application is that missile launch can be initiated rapidly with limited knowledge of the launch conditions. After booster separation, the vehicle performs two stellar observations in the serene environment of outer space, calculates the precise launch conditions, integrates its acceleration history to establish current position and velocity, and calculates and applies the vernier thrust required to impact on the prescribed target.

The direct application of the stellar-inertial guidance system disclosed in the copending application provides precise knowledge of position and attitude for a single orbit or possibly a two-orbit mission and permits precise recovery.

The concept of this invention adds only a horizon scanner to the guidance system of the copending application and provides the navigation and guidance which will bound all guidance position errors. Thus, position and attitude can be accurately maintained for longer missions lasting up to 10 days or more in a completely quiet or passive mode of operation. The maximum mission life is not limited by guidance capabilities but rather by power requirements and reliability considerations.

In order to adequately describe this invention, it is necessary to have a basic understanding of the guidance system disclosed and claimed in copending application 115,867, now Patent No. 3,301,508, which is hereby incorporated as part of the present disclosure, and which should be referred to for a detailed description. For purposes of clarity, a brief summary of the essential features and components of the guidance system will now be presented.

The guidance system consists of an inertial measurement system, star angle sensor, flight computer, and a vehicle control system. A power supply system and cooling system are also provided in support of the guidance system. All of those subsystems are packaged within the reentry vehicle so that the guidance function is continuous from launch to impact.

The stellar inertial guidance system provides for a highly flexible launch posture as applied to the ballistic missile application. This flexibility makes it possible to provide a fast response, mobile, easily retargeted weapon system which may be launched in relative ignorance. It is only necessary to know one of the launch parameters precisely and the others may have uncertainties which may be compensated for following booster separation and orientation of the vehicle launch conditions on the basis of stellar observations and the recorded acceleration profiles. The degree of ignorance is only limited by the field of view of the star-angle sensor and the propulsion capabilities of the velocity control system of the vehicle.

This operational flexibility is also applicable to the space navigation system; however, the more precisely the launch conditions are known the more accurate is the injection. Injection accuracy is a prime problem for short term missions in which the horizon scanner is not used. For the space navigation system using the horizon scanner, the injection errors are rapidly attenuated and thus do not affect the precision of navigation for multiple pass missions.

In the case of well-established launch conditions, the stellar observations would permit an evaluation of certain sensor errors resulting from the boost acceleration and provide a means of compensating for these errors to obtain maximum impact accuracy or precise injection conditions as might be required for satellite applications. This capability of gyro and accelerometer compensation is described in detail and claimed in copending application Serial No. 135,358, entitled "Space Vehicle Guidance System," filed August 31, 1961, now Patent No. 3,310,982, by Joseph Yamron and assigned to the same assignee, which application is hereby incorporated as a portion of the present invention.

In the powered-flight phase, the guidance system performs the same task regardless of the mode of operation; i.e., it controls the ascent trajectory, integrating the accelerations to obtain velocity and position, and cuts off the booster power when the desired injection conditions have been attained. In the free-flight phase, the only difference in operation for different modes is that the computer program corrects different initial quantities on the basis of the stellar observations.

Another novel feature of the guidance system is that since the entire guidance package is included in the reentry vehicle, navigation during reentry is possible. The vehicle is thus capable of steering out atmospheric anomalies, aerodynamic or packaging dissymmetries, and vernier thrust cutoff errors sensed by the guidance system. A proportional type of navigation is used to generate steering commands, but it is obvious that other types may be used. These commands are executed by a vehicle control system which will trim the reentry vehicle to produce a lateral aerodynamic steering force. A reaction type of vehicle control system is preferred for ballistic missile applications, but for the satellite system it now appears that an aerodynamic or mass unbalance system will be preferable. The reentry phase of flight will be the same for all modes of system application.

The inertial measurement subsystem (IMS) provides the angular and linear sensor information to permit navigation with reference to inertial space. This unit could be of any type, i.e., stable platform or strapped-down IMS. The platform type consists of an inertial measurement unit (IMU) or stable platform, its associated off-platform electronics, and an input-output unit (IOU).

The IMU is a four-gimbal stable platform providing three degrees of rotational freedom for a stabilized center cluster containing three gyros and three accelerometers. The fourth gimbal is necessary to avoid the possibility that a sequence of maneuvers can leave two of the three inner gimbals coplanar, thus limiting the cluster to two degrees of freedom. Under any circumstances applicable to the guidance system the fourth gimbal can be driven to a position which will maintain full rotational freedom for the cluster.

The gyros, mounted so that their sensitive axes form an orthogonal triad, serve as an inertial reference since their spin axes tend to remain fixed in inertial space. In an ideal or frictionless and zero mass gimbal system, the gyros would maintain their positions in inertial space within the limits of their own internal drift rate, which is extremely small. However, in an actual gimbal system various external disturbing torques exist and would cause errors in the spatial reference of the gyros. These errors are prevented by using each gyro as a sensing element to control a null seeking gimbal servo loop. These servos control linear D.C. motors, called torquers, mounted on each of the gimbals. When the platform is subjected to a disturbance and the gyro starts to deviate from its null position, the servo loop causes the torquers to generate torques counter to those disturbing the gimbals, thus preserving the spatial reference.

The accelerometers are mounted on the cluster so that their sensitive axes form an orthogonal triad having a known orientation with respect to the gyros. The accelerometers sense the acceleration of the vehicle. When the acceleration due to gravity is corrected for, the vehicle motions in inertial coordinates can be obtained, and the change in position and change in velocity of the vehicle calculated.

Vehicle attitude information is obtained by measuring the angle that each gimbal makes with its adjacent gimbal. To obtain these angles with the desired accuracy, an inductosyn is used. This unit is basically an air core, multispeed resolver. The inductosyn-resolver attitude information is processed in an electronic unit called the input-output unit. This unit converts the analog information from the IMU into a digital form acceptable to the digital computer, and also converts computer commands into a form acceptable by the IMU components.

The off-platform electronics contain the gimbal stabilization loops, accelerometer amplifiers and integrating circuits and resolver amplifiers. The circuitry required for erection, gyro compassing and automatic gyro trim will be located in a separate electronic package external to the missile.

The strapped-down system or a nongimballed IMU, provides a much simpler, smaller, less costly and yet functionally flexible IMU. This IMU configuration rigidly attaches all of the sensors to a ground structure whose orientation does not remain fixed in inertial space, but rather the computer keeps track of the orientation of the ground structure by means of the sensor outputs. A technique of pulse torquing is utilized to maintain knowledge of orientation rather than the normal analog-sensor signal. This technique provides the sensor outputs in a precise digital form such that adequate angular accuracy can be attained.

The strapped-down IMU is disclosed and claimed in U.S. Patent 3,272,972, entitled "Random Orientation Inertial System," by Joseph Yamron and Andrew E. Scoville, and the pulse torquing system is disclosed and claimed in U.S. Patent 3,192,371, entitled "Feedback Integrating System," by Charles B. Brahm.

The strapped-down system permits the star-angle sensor (SAS) to be rigidly attached to the same ground structure as the inertial sensors and thus provides a higher degree of accuracy in establishing the inertial frame of reference from the star sights. It also permits a reduction in system power requirements even though the computer functions are increased.

The practicality of the stellar inertial, strapped-down package can be enhanced by the addition of a set of crude gimbals around the package. These gimbals provide the following functions: first, to rotate and position the star sensor to a star in response to a command from the computer; second, for high angular rates of the vehicle to stabilize the gimbals to the extent necessary to reduce the dynamic range of the gyro rate loop and hence improve its accuracy; third to attenuate the relatively high frequency component of the vehicle angular vibration which might otherwise be transmitted to the cluster; and fourth, to provide adequate stabilization during star sight to assure small angular motions of the sensor.

The star-angle sensor (SAS) is an integrated unit with a folded (Cassegrain) optical system to focus light energy frm a selected star on a photosensitive detector. The nature of the signal is such that, through computation by the flight computer, it will provide an angular measurement of the location of the star image with respect to the optical axis. The star-angle sensor is described in detail and claimed in U.S. Patent 3,242,795, entitled "Star Angle Sensor," by John Victor Hughes, and reference should be made to this patent for a complete description of the star-angle sensor and its electronics.

The flight computer is the basic control and memory of the guidance system. It contains the system logic, extracts information from the sensors, performs calculations to generate navigation and guidance commands, and instructs the subsystems to execute the calculated commands. The computer controls the system for all phases of the mission from launch to impact.

The flight computer may be a general purpose, high speed, digital computer, which has high speed storage units, a data memory and a program memory. The computer is a stored program synchronous machine.

The vehicle control system is comprised of two major subsystems—the attitude control subsystem (ACS) and the velocity control and reentry steering (VCS/RS) subsystem. The vehicle control system provides midcourse trajectory correction, reentry steering and all desired orientations and stabilizations of the reentry vehicle throughout the flight.

The ACS consists of six low-thrust nozzles arranged in clusters of three each to provide orientation about three body axes whenever required. The ACS is a cold gas, proportional thrust system, utilizing nitrogen under high pressure as the working fluid. The VCS/RS subsystem contains four separate nozzles, offset from the roll axis and canted inward at an angle with respect to the roll axis. These nozzles provide the impulse required for midcourse trajectory correction and reentry steering. The VCS/RS is a hot gas thrust generating device utilizing storable hypergolic propellants.

The autopilot function from boost to target is performed by the attitude control system (ACS) and velocity control system (VCS). Commands for vehicle orientation and control are received from the flight computer by the ACS electronics and are then channeled to the proper system.

To provide power during flight a power supply is carried aboard the reentry vehicle. A 28-volt battery and static conversion electronics are utilized. Prior to launch, power is supplied from an external source. A cooling system is also provided to cool the internal components of the reentry body during flight.

The guidance system as thus briefly described can be applied directly to a satellite for a single orbit mission. After injection into orbit, the accelerometers are not used since the drag forces are below the threshold of the sensor, and knowledge of position degrades after one or two orbits. Reentry steering is used to nullify atmospheric and vehicle anomalies.

The primary objective of the guidance system is to provide a continuous precise knowledge of position and attitude with respect to the earth of a satellite in orbit. The direct application of the stellar-inertial guidance system to a single orbit or possibly two orbit mission, meets this objective and permits highly accurate observations and precise recovery. However, a new concept which adds only a horizon scanner to the stellar-inertial guidance system provides the navigation and guidance which will bound all guidance position errors, and position and attitude can be accurately maintained for longer missions. The maximum mission life is not limited by guidance capabilities but rather by the power requirement and reliability consideration.

In order to conserve power for the longer term missions, it may be desirable to be able to shut down the space navigation system and to extrapolate position with respect to time. Thus periodically, or whenever accurate positional knowledge is required, the complete guidance system would be reactivated and by completely passive means reestablish its position and attitude precisely. The time period between updatings is dependent on the rate of degradation of position with the IMU inoperative and the angular field of view of the star-angle sensor. If the vehicle is stable in some known orientation with respect to the velocity vector or gravity gradient, this will aid the horizon scanner in initially establishing the local vertical to the earth from which to reestablish position. Such a guidance system would make it possible to perform many satellite misisons.

Guidance systems for certain satellite missions must provide precise attitude and position information. The stellar-intertial guidance system provides extreme attitude accuracy relative to inertial space for essentially indefinite time periods and high position accuracy and earth referenced attitude for time periods equivalent to one or two orbits. The position accuracy and earth referenced attitude degrades continuously because of the open integrations of acceleration, predominantly that of gravity, required to obtain velocity and position. This continuous degradation can be eliminated with the addition of vertical information from a horizon sensor. Historically, these sensors are notoriously inaccurate but reliable pieces of hardware. This invention relates to a manner of mechanization in which the information from the horizon sensor is used to damp the inertial navigation loops. In this manner the inertial navigator maintains its high basic accuracy and the horizon sensor eliminates the divergence of the calculated position.

Another embodiment of this invention relates to the use of adaptive control system techniques to determine the orbital elements, i.e., those quantities which define the motion of the orbiting vehicle about the central body. This embodiment establishes a mathematical model of the orbit of a satellite, using data obtained from the stellar-inertial guidance system and horizon scanner to update the orbital elements from which to predict the orbital position.

It is therefore an object of this invention to provide a satellite or space vehicle guidance system including a stellar-inertial unit and a horizon sensor to maintain accurate position and attitude information during flight.

Another object of this invention is the use of a horizon sensor and a stellar sensor to provide signals with which to bound the normally divergent navigation outputs from an inertial unit in a space vehicle guidance system.

A further object of this invention is the use of information from a horizon sensor and a stellar-inertial guidance system in a continuous manner to feedback into electronically mechanized equations of motion to provide measurement of position and velocity during flight of a space vehicle.

Another object of this invention is the use of a horizon sensor in conjunction with a stellar-inertial guidance system to measure orbital period and angular location from which vehicle position and velocity may be calculated.

A further object of this invention is the use of a horizon sensor in conjunction with a stellar-inertial guidance system whereby the information from the horizon sensor is used to damp the inertial navigation loops to thereby eliminate the divergence of calculated position of the inertial navigator.

Another object of this invention is a space vehicle guidance system in which the inertial measuring system may be shut down and re-erected in space.

Another object of this invention is a satellite guidance system in which a mathematical model of the orbit of a satellite is established.

A further object of this invention is a satellite guidance system which uses adaptive control system techniques to determine the orbital elements to thereby establish satellite position information.

Another object of this invention is an adaptive satellite orbital model in which the parameters of the orbital model are automatically updated by errors between predicted and measured local vertical by means of information from a horizon sensor or other sensor outside the inertial sensor.

A further object of this invention is a space navigation system in which a mathematical model of the orbit of the satellite is established and in which a horizon scanner is used in conjunction with a stellar-inertial guidance system to provide information as to local vertical.

Figure 4:
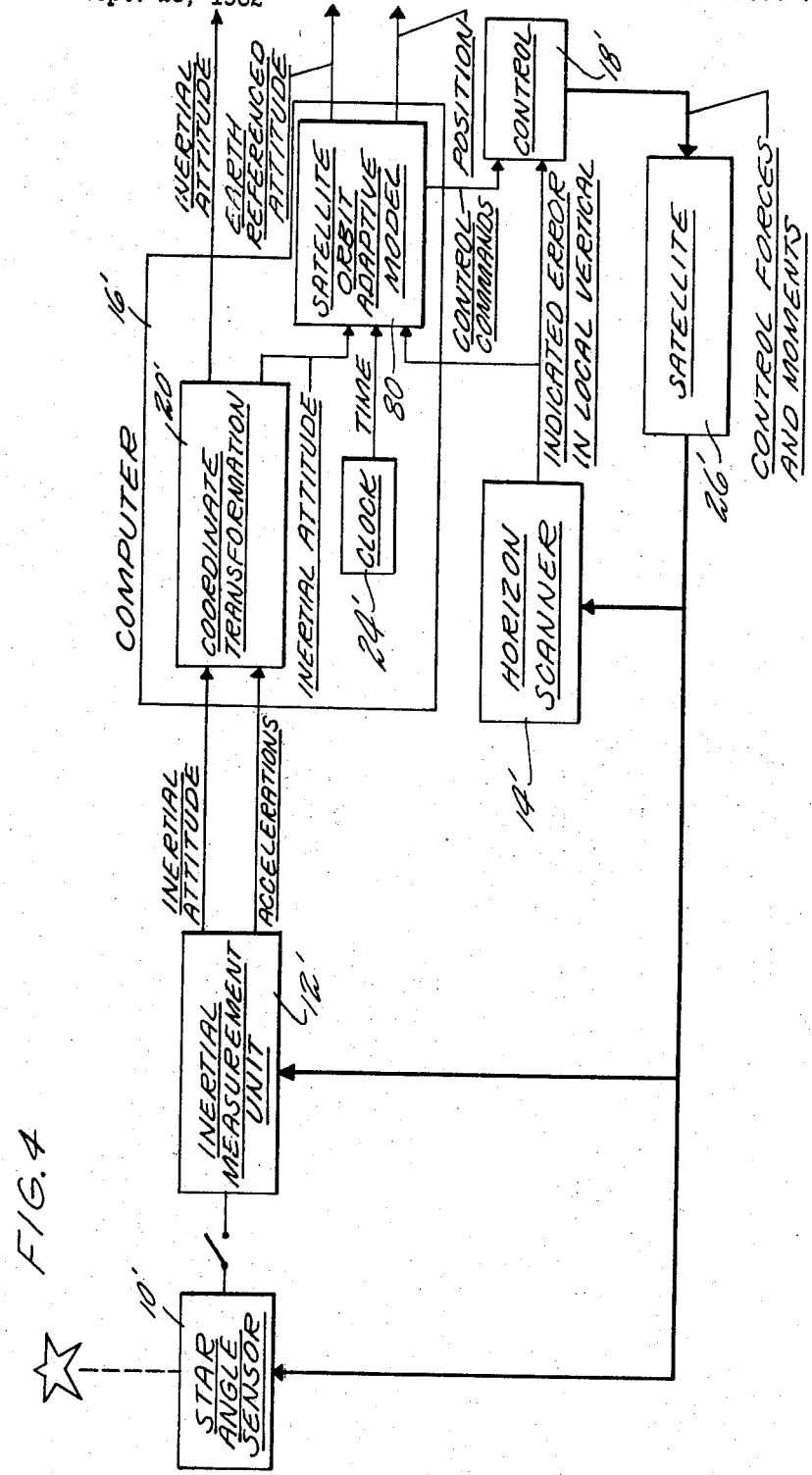
Figure 5:
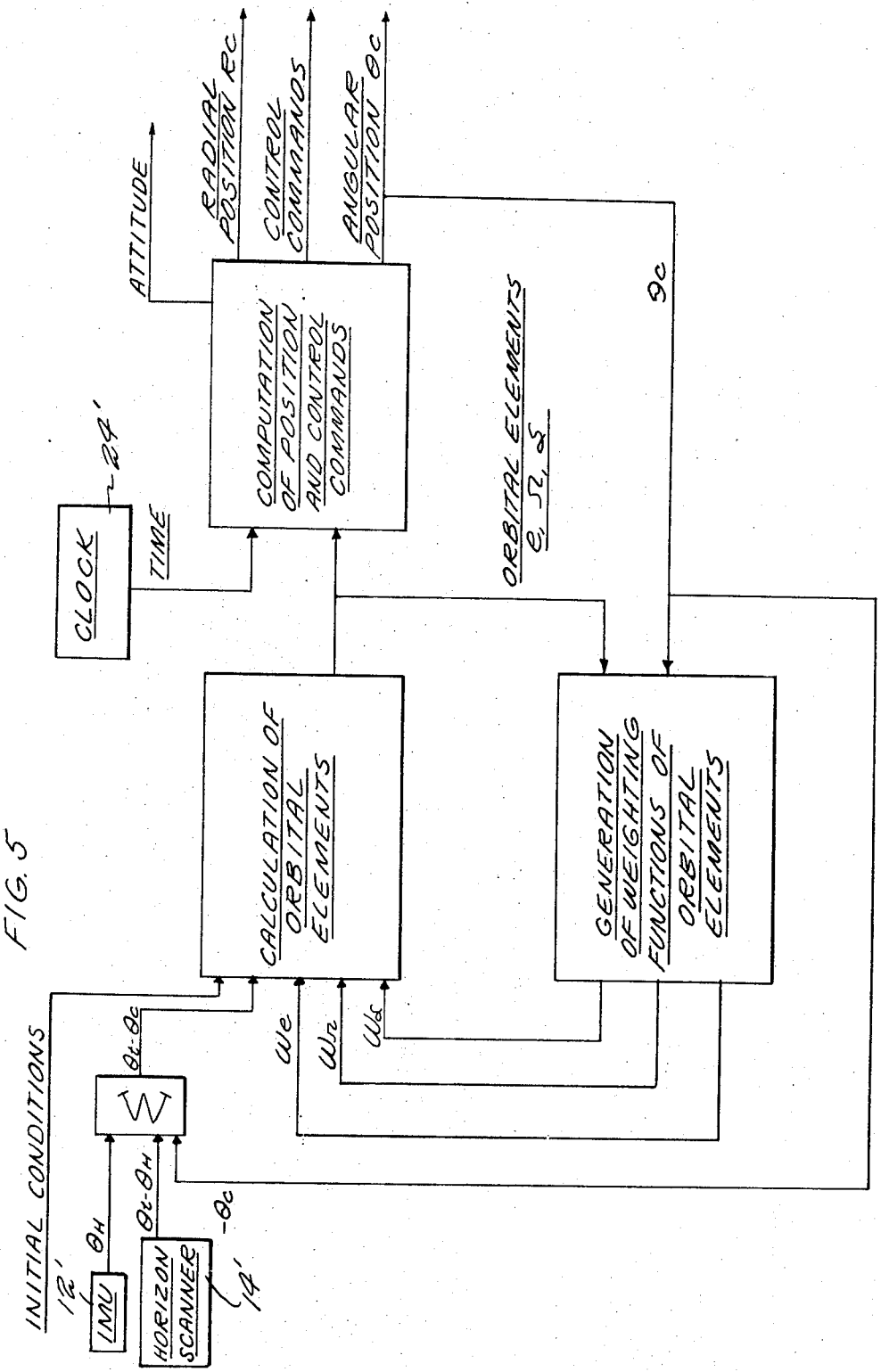
Figure 6:
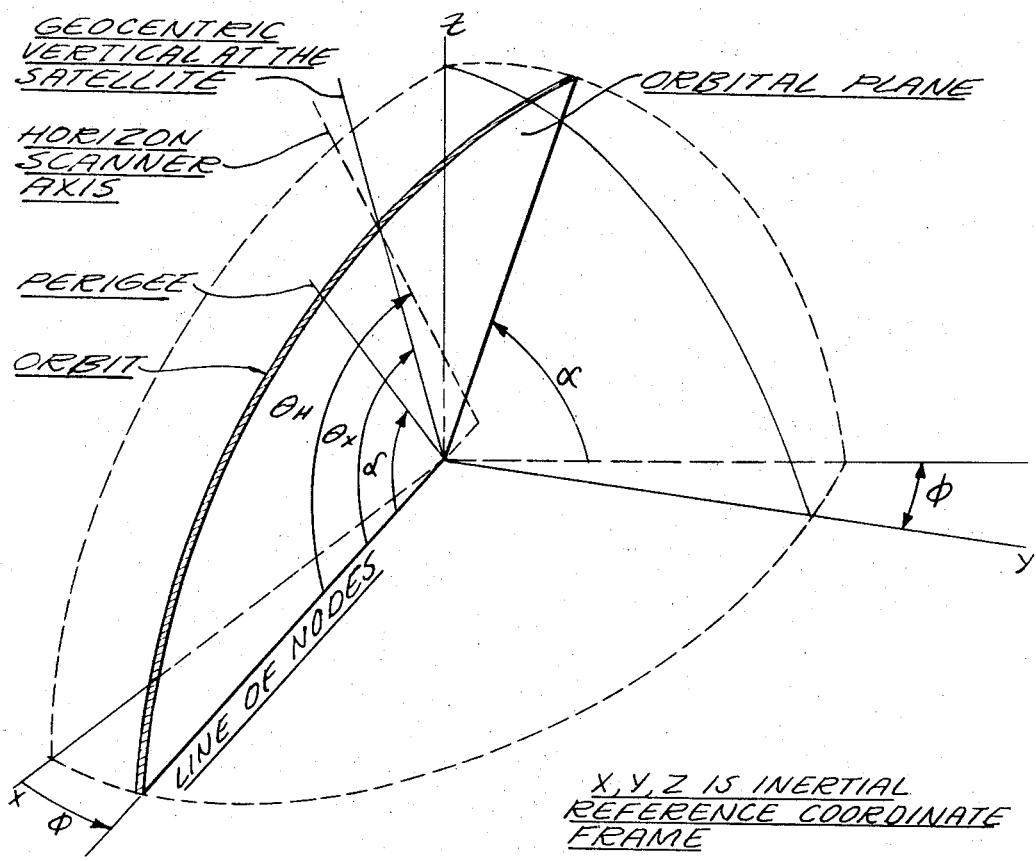
Figure 7:
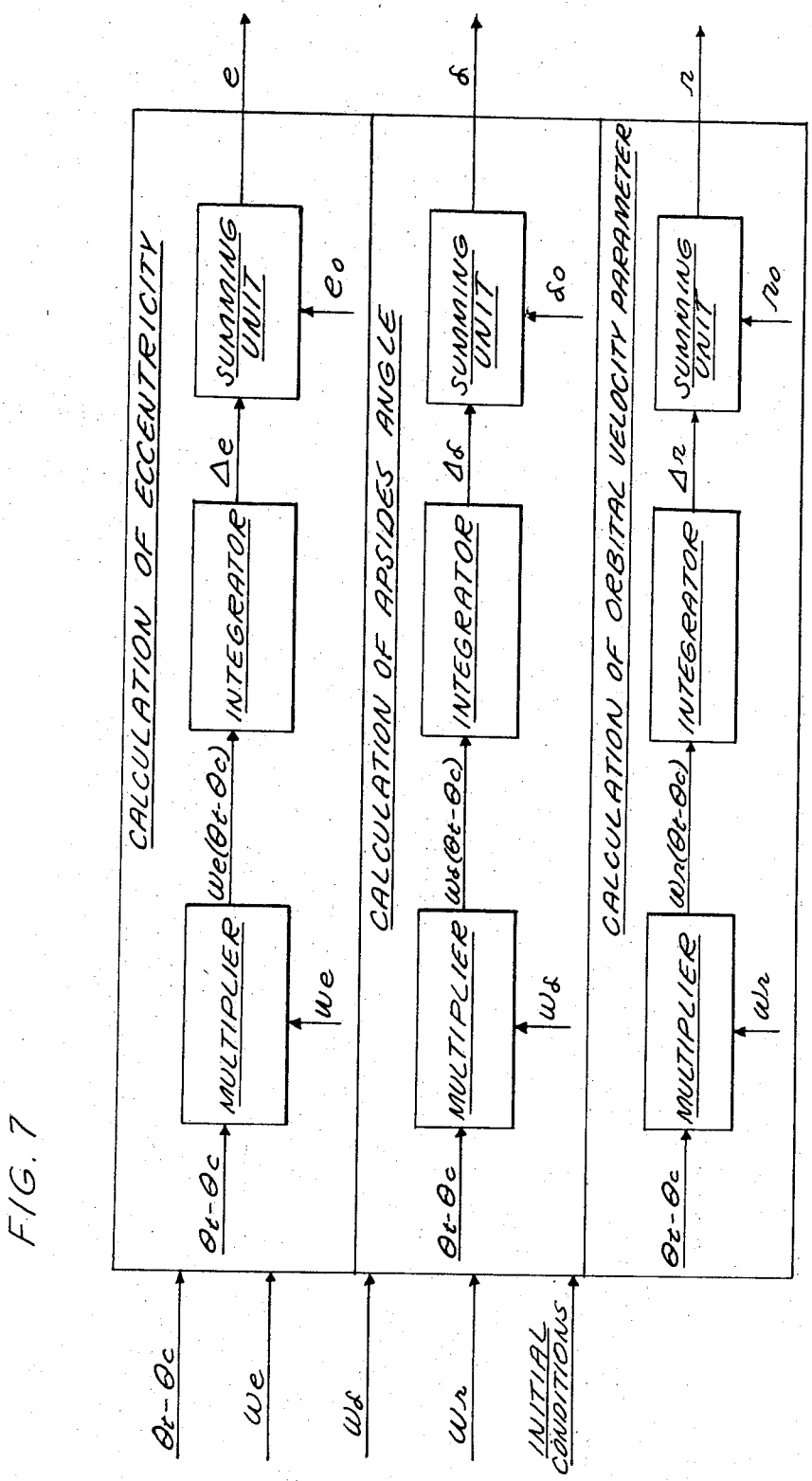
Figure 8:
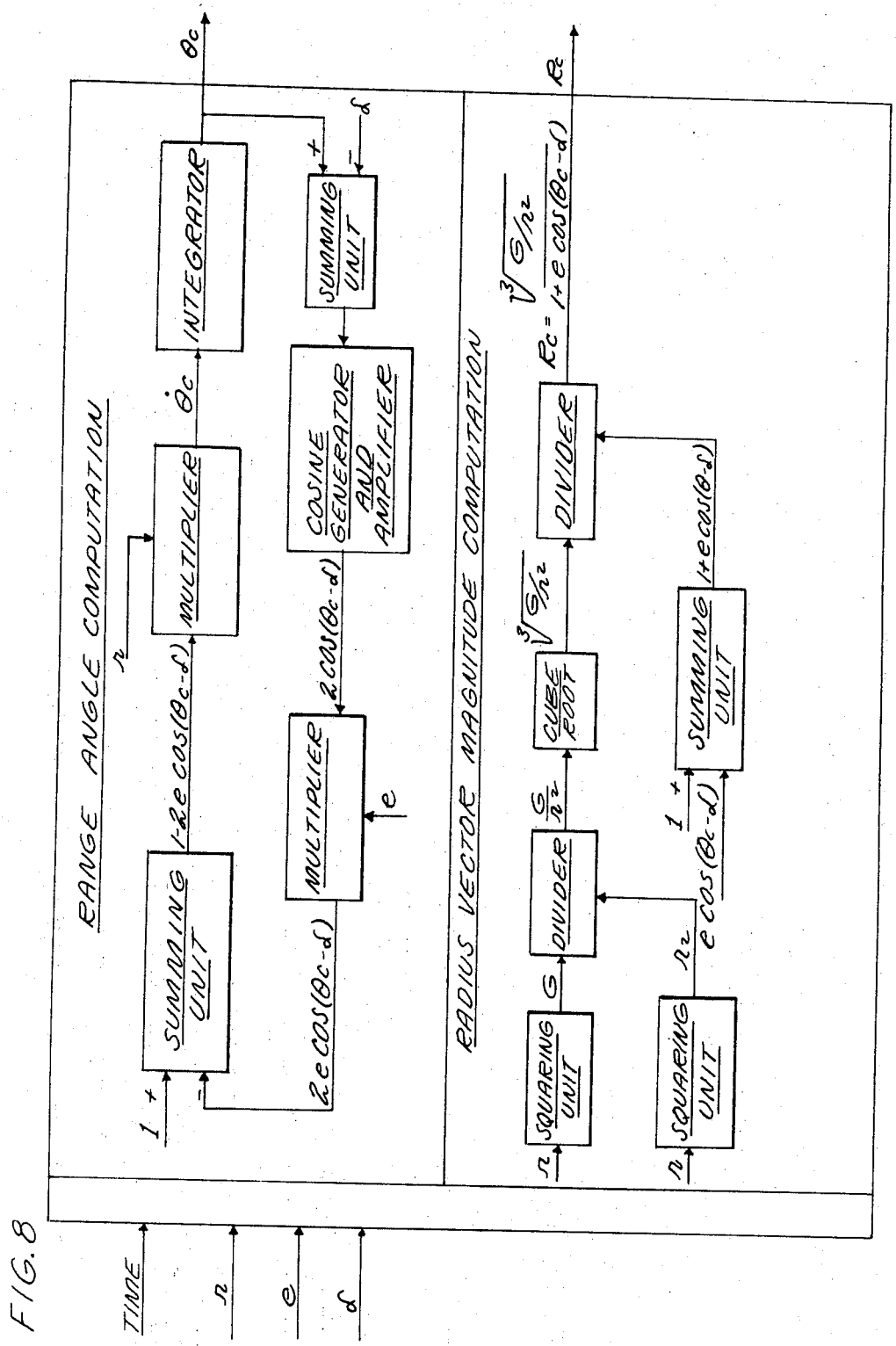
Figure 9:
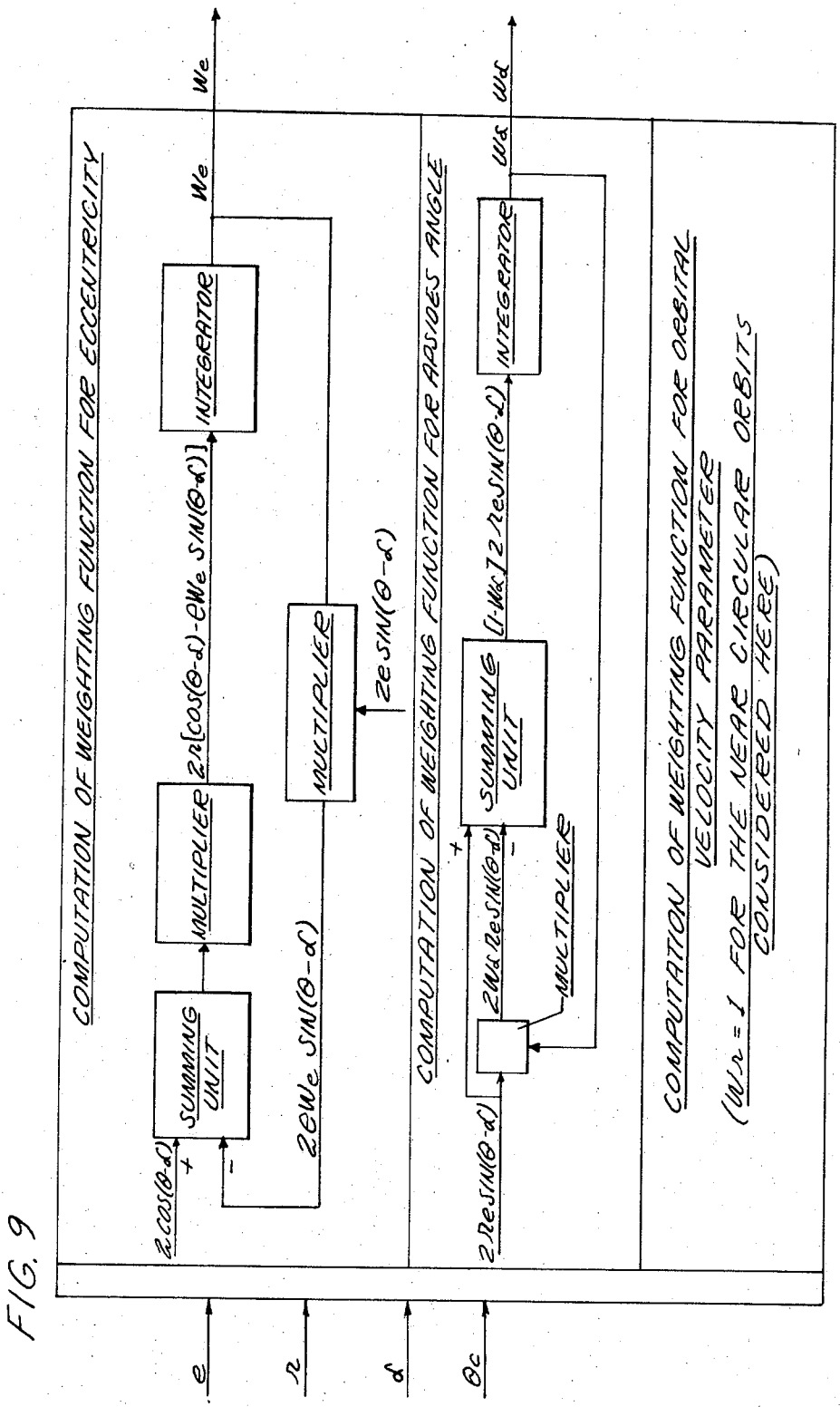

These and other objects and a fuller understanding of the invention may be had by referring to the following description and claims, read in conjunction with the accompanying drawings, in which:

FIGURE 1 is a schematic block diagram of the entire satellite guidance system; and FIGURE 2 is a flow diagram of the general satellite navigation loop for computing position; and FIGURE 3 is a flow diagram of a specific satellite navigation loop for computing position; and FIGURE 4 is a schematic block diagram of the adaptive space navigation system; and FIGURE 5 is a functional schematic of the satellite orbit adaptive model; and FIGURE 6 shows the inertial reference coordinate frame and the geometrical relations of the orbiting vehicle; and FIGURE 7 is a functional schematic of the calculation of orbital elements; and FIGURE 8 is a functional schematic of the calculation of position; and FIGURE 9 is a functional schematic of the generation of weighting functions for the orbital elements.

The addition of a horizon sensor to the stellar-inertial guidance system results in a unit, referred to as to the space navigation system, which has available as basic information vehicle accelerations, referenced to inertial space, vehicle attitude referenced to inertial space, earth local vertical referenced to inertial space and time. The subtence angle of the earth is also available, but is not required for normal operation of the space navigation system. It is used for crude initial information during self-erection. This basic information, if used directly, does not provide sufficient data to bound the radius coordinate. However, if these data are used in the manner set forth herein, the position and earth referenced attitude computed will be bounded, and continuous precise knowledge of these quantities will be obtained.

There are many different types of horizon sensors, each of which have different characteristics. A brief résumé of the theory and operation of horizon sensors will now be given. Such sensors are well known in the art, and many papers have been published describing horizon sensors, such as "Horizon Sensing for Attitude Determination," by B. K. Lunde, presented to the Goddard Memorial Symposium of the American Astronautical Society at Washington, D.C., March 16, 17, 1962.

In space navigation, it is often necessary to determine the angles between the direction to the center of another body and the axes of the vehicle. The direction to the center of the other body may be found by calculating the direction which is perpendicular to the plane of its horizon. In order to determine this plane from a space vehicle, the angles between direction of the discontinuity of radiation between space and the body of interest and the axes of the vehicle are determined at several points on the horizon. There are several physical phenomena which make possible a variety of methods of sensing the discontinuity between space and the body of interest—in other words, the horizon. One physical phenomenon which differentiates it from space is the radiation emitted in the infrared portion of the spectrum. The earth's horizon may be defined as the sharp gradient of infrared radiation which exists at the limb, or border, between it and outer space.

The sunlight which is reflected by a body in space such as the earth, sometimes referred to as the albedo, is another phenomenon which has been used for horizon determination. However, it is limited in application. At night, when the earth is eclipsing the sun with respect to a space vehicle, no reflected sunlight appears.

The upper portion of the earth's atmosphere radiates due to excitation by the sun. This phenomenon, known as air glow, could be used to define the horizon. The radiation occurs both day and night.

The horizons of bodies other than the earth may be defined by use of the same general phenomena already discussed.

There are five scanning schemes which have been used or proposed for determining the direction of the local vertical. The first type, passive scan, can only be used on a space vehicle which rotates. A sensor with a small field or view is mounted in vehicle with its field of view perpendicular to the spin axis of the vehicle. As the vehicle rotates the field of view of the sensor is swept through space.

A second type of scanning method is the conical scan. Each scanner has a small field of view. The rotation of the field of view is done in the scanner itself. The field of view is rotated in a circle, and it scans a cone out of the space. This cone intersects the earth and the output of the sensor is used to determine the location of the gradient of infrared radiation between space and the earth. The local vertical can then be computed from the operation of two such scanners mounted with their axes normal to each other.

A third type of scanning pattern in the linear scan. There are three or more sensors on the vehicle and they each have small fields of view. These fields of view are rotated in a plane from space until they intersect the edge of the earth. They are oscillated at the edge of the earth for the rest of the flight time. The angle between the direction of the fields of view of each sensor, once they have locked on the edge of the earth, and the satellite can be determined and the direction of the local vertical can be calculated.

A fourth type of scanning is called nutating scan. It is similar to a linear scan but there is only one sensor per vehicle. The field of view of the sensor is again small and is initially viewing space. It is swept down until it intersects the horizon. It then oscillates about the horizon. Meanwhile the whole scanning head is rotated about a fixed axis normal to the axis of the sensor oscillating motion. Thus the projection of the sensor field of view on the earth is a sinusoidal pattern along the earth's horizon. The direction of the local vertical is then determined by calculations using the position of the field of view of the sensor with respect to the vehicle at each instant.

A fifth type of horizon sensing does not use any moving parts. The illumination from one side of the earth on the scanner is compared with that from the other side of the earth. This information is used to determine the local vertical.

There are two basic limitations to the accuracy of any determination. One source of inaccuracy is errors developed in the instrument which makes the determination and the other source of errors is variability in the physical phenomenon which is utilized for the determination. In the case of horizon scanner, the source of instrument error are detector noise, mechanical tolerances, and mounting rigidity.

The other class of phenomena which cause errors in detecting local vertical are those due to the heavenly body in question. Errors which are dependent on the physics of the body generally are proportional to the apparent diameter of the body and thus decrease in absolute magnitude as the scanner gets farther away from the body. The maximum error due to the ellipticity or oblateness of the surface of the earth in determining the direction of the horizon at one point is not greater than $\frac{1}{10}$ of a degree.

Another source of error for some types of scan is cold clouds appearing on the surface of the earth.

All horizon scanners discussed above give a relatively poor signal: The choice of horizon scanners appears to be among the conical, linear and nutating types, the choice being the one which gives the best output signal. This invention is intended to filter or smooth the horizon scanner information and provide precise bounding of position, as will be described.

Satellites missions may require precise knowledge of position and attitude over relatively long periods of time. The stellar-inertial guidance system may provide adequate navigational information for short periods but the knowledge of position and attitude relative to the central body will diverge with time even with an ideal inertial reference due to uncertainties of the injection conditions and small perturbing forces. In order to prevent the errors in position and attitude from diverging without bound after injection, additional information over and above that provided by the inertial reference is required which will sense the divergence and provide corrective signals to the computer tracking loops to bound the position errors within specific limits.

The knowledge of the local vertical to the central body of the orbiting vehicle would provide a means of sensing the divergence of the tracking loop from which the corrective signal could be generated. Such knowledge of local vertical may be provided with limited accuracy from a horizon scanner. Horizon sensor of the conical, linear or nutating scan types, as described above, would be suitable. All of these horizon sensors are subject to uncertainties of establishing the local vertical due to instrument errors and the physical characteristics of the horizon. Currently horizon sensor have been developed in which the instrument errors are small relative to the physical uncertainties of the input signal from the horizon. The conical scan is most subject to uncertainties since it scans the surface of the central body whereas the linear and nutating scanners only scan the region of the horizon. The nutating scanner is least subject to uncertainties since it establishes the vertical by sampling the horizon at a multitude of points whereas the linear scanner samples only three of four discrete points. Even with best possible horizon sensor performance, the instantaneous indication of the local vertical is insufficiently accurate to be utilized directly with the staller-inertial reference to provide an indication of position. Such inputs are unable to define the magnitude of the instantaneous radius vector so that altitude is not defined. It is the purpose of this invention to describe a means of utilizing a horizon scanner in conjunction with a stellar-inertial reference unit in such a way as to bound the navigation errors and thus provide a means of precise space navigation and attitude reference.

The space navigation concept is dependent on boost and injection of a satellite vehicle containing a stellar-inertial guidance system and a horizon scanner into orbit. The inertial guidance system may be utilized for the navigation and control of the vehicle throughout the boost phase, as described in copending application Serial No. 115,867 and 135,358. Upon injection, the star-angle sensor is used to check the alignment of the inertial reference by taking two star sights and the velocity and position of the satellite is obtained by integration of the gravity potential and inputs from the accelerometers of the IMU if the inputs are larger than the threshold of these sensors.

Otherwise the accelerometers may be shut down during periods when no thrust is being applied, and these inputs assumed zero. The computer logic must compare the booster injection conditions with the desired conditions and compute and apply the velocity correction required to inject into the desired orbit with a high degree of precision. The tracking loop of the computer utilizing the inertial reference and the gravity potential thus provides an indicated position and local vertical as a function of time. The indicated local vertical is then compared with that sensed by the horizon scanner and the difference is used so as a signal which is fed back into the tracking loops through a smoothing or filter network which causes the indicated vertical of the tracking loop to approach the smoothed mean value of the horizon scanner signal. It is also necessary to sense the angular rotation of the horizon scanner local vertical relative to the inertial reference to establish the period of the orbit. The initial angular momentum of the orbiting vehicle is established by the injection conditions. However, the angular momentum will decay with time due to externally applied forces so small that they cannot be sensed by the accelerometers. The knowledge of angular momentum is required to bound the magnitude of the radius vector or altitude. The angular momentum is used in conjunction with the indicated angular velocity of the tracking loop to generate a reference radius which is compared with the tracking loop indicated radius and the difference is fed back through a filter network to the tracking loop to bound the error in the magnitude of the position vector. The angular momentum may be continuously changed on the basis of the smoothed horizon scanner information or updated at discrete intervals. By these means the indicated position vector of the tracking loop is made to converge with the smoothed position vector provided by the horizon scanner information.

A simplified block diagram is shown in FIGURE 1 to illustrate one possible mechanization of the invention. FIGURE 1 shows the basic space navigation system which includes a star-angle sensor (SAS) 10, an inertial-measuring unit (IMU) 12, a horizon scanner 14, a flight computer 16, and a vehicle control system 18. The SAS 10 is trained on selected stars, and the SAS output signal is utilized to periodically update and calibrate the gyros in the IMU 12 for drift and scale factor in order that the inertial reference may be preserved. This operation is described in application Serial No. 115,867. The IMU 12 may be either a stable platform or strapped-down unit which contains a set of three gyros and three accelerometers from which changes in orientation and linear motion are sensed. The outputs of these IMU sensors are fed to computer 16 where, if necessary, a coordinate transformation takes place as shown by block 20. The transformed IMU outputs are then utilized by computer 16 to provide a direct attitude reference with respect to inertial space, and, by means of position tracking loops shown at 22, to provide a local earth referenced attitude output as well as an indication of velocity and position. This is accomplished in the computer 16 by integration of the tracking loop of the accelerations due to the gravitational fields and the applied forces. A clock 24 in the computer 16 provides a means of correlating the position information with time and with earth fixed coordinates. The tracking loop 22 is also provided with a signal from the horizon scanner 14 which is proportional to the deviation of the local vertical from the horizon scanner axes and which, when added to the attitude of the horizon scanner axis as provided by IMU 12, the orientation of the sensed local vertical relative to inertial space is obtained.

The deviation of the tracking loop indicated vertical from the horizon scanner sensed vertical is filtered or smoothed within the tracking loop 22 and fed back on the loop with appropriate gains to tune and damp the loop in such a manner as to make the indicated position of the tracking loop coincide with the smoothed information from the horizon scanner 14. On the basis of the indicated position of the tracking loop 22 and knowledge of the desired orientation, control commands will be generated for the vehicle control system 18 to drive the satellite 26 in attitude and velocity. The application of the control signals and forces to the vehicle by means of satellite drive 26 result in motions which are immediately transmitted to the various sensors as shown by the heavy lines.

The signal from horizon scanner 14 is also shown feeding into the vehicle control system 18 where it may be used as a redundant control signal in order to stabilize the vehicle with respect to the local vertical if the remainder of the navigation system was not functioning for some reason.

The general tracking loop concept is presented schematically in FIGURE 2 and represents the basic concept of mechanizing the equations of motion in conjunction with an external indication of position relative to the central body to feed back the deviation between indicated and sensed position via a filter which will smooth and meter the feedback to obtain the desired results. Basically the initial conditions $a_0$ and acceleration from potential fields and applied forces $a$ are integrated once at 40 to obtain velocity V and a second time at 42 to obtain position P. The indicated position P is then compared with the position indication $P_H$ from the external source such as the horizon scanner to generate a differential signal $(P-P_H)$ which is fed back through the filter circuit 44 with the desired gains 46 to velocity and acceleration. The feedback on velocity provides damping of the network whereas the feedback on acceleration tunes the network with the external information of the horizon scanner. There are many ways of mechanizing the generalized tracking loop of FIGURE 2 representing utilization of various inertial coordinate frames and methods of utilizing the external information in conjunction with the network simulating the equations of motion. The most suitable mechanization is dependent upon the mission requirements and types of system errors associated with the particular hardware used.

One of many such mechanizations is presented in FIGURE 3 which utilizes spherical inertial coordinates as defined by the magnitude of the radius vector R and two angles, the range angle $\theta$ and the out-of-plane or cross-range angle $\phi$. The accelerations $a_R$, $a_\theta$, and $a_\phi$ are the accelerometer inputs which are generally zero while in orbit. However for maneuvers or low altitudes where the drag deceleration is sufficiently large to be sensed by the accelerometers, these inputs will be measurable. In the case of the R and $\theta$ loops, additional inertial and gravitational accelerations such as the gravitational constant G are fed back to simulate the equation of motion, the gravitational constant G is equal to the universal gravitational constant times the mass of the central body. The summation of the accelerations is integrated once at 50, 50′ and 50″ to obtain the radial and angular velocities respectively. The second integration at 52, 52′ and 52″ yields the indicated position radius vector in magnitude and direction. Because of errors in initial conditions and problems of integration, these basic loops would diverge. To prevent divergence, inputs from the horizon scanner, $\theta_H$ and $\phi_H$, as measured with respect to the inertial reference (IMU), are compared to the computed values of $\theta$ and $\phi$ and the differential is fed back on the loop to damp and tune the loop in such a manner as to drive the error signal to zero or cause the indicated angular positions to converge with the smoothed horizon scanners inputs. Gains 54, 56, 58 and 60 are provided. To prevent divergence of the radius (R) loop, a reference radius R′ obtained from the angular momentum of the orbital vehicle using the relationship:

$$M=(R)^2\dot{\theta} \quad \text{or} \quad R'=\sqrt{\frac{M}{\dot{\theta}}}$$

as shown in block 62. R' is compared to the calculated R at 64. The differential is fed back on the R loop through gain network 66 after the first integration. Since errors in angular momentum cause undamped perturbations of both the R and $\theta$ loops, it is necessary to integrate the feedback signal of the $\theta$ loop at 68 and sum it with the initial angular momentum $M_0$ to provide a continuously updated value of momentum to be used in conjunction with the indicated angular velocity for determination of the reference radius R'. Utilizing a horizon scanner in conjunction with a stellar-inertial guidance system in such a manner provides a navigation system in which the positional errors are adequately bounded to provide a precise self-contained guidance system for relatively long term orbital missions. This guidance system is also capable of sensing and following any and all maneuvers executed during the mission or may be used in conjunction with a velocity control system to follow a preplanned orbital path compensating for all anomalies of atmosphere, gravity, solar pressure, etc.

The type of guidance system described permits a large degree of flexibility of operation since it can be launched in ignorance into a preplanned orbital path and can orient itself and correct its orbital path to synchronize with the preplanned position. The degree of ignorance of launch is limited only by the propulsion capabilities of the velocity control system. The boost phase utilizes only the guidance logic of the stellar-inertial guidance system previously described. Once in orbit, the horizon scanner is closed into the tracking loop in the manner previously described. Any bias of the horizon sensor will contribute a systematic error into the navigation system unless the sensor bias is compensated for. Thus it is necessary to minimize the effect of this bias by compensation, by calibration or by automatic mechanization. Calibration is possible by comparison of horizon scanner outputs with the instrument rotated to different orientations in inertial space or may be automatically compensated for by continuous slow rotation of the sensor such that the effect of the bias is integrated out to be zero. This latter scheme may be easily accomplished if not inherent in a nutating scanner. The scale factor of the scanner does not have to be known precisely since it is used only as a feedback signal which is driven to a null.

The accelerometers are not essential in orbit and will probably be shut down during orbital flight to conserve power. Small perturbing forces causing gradual changes in the flight path will be sensed by the horizon scanner and the tracking loop will follow these changes of flight. If large or sudden changes of orbital path are contemplated, the accelerometers will be reactivated to sense the accelerations caused by the applied forces, and then shut down again. The precision of the accelerometers is not critical since they are only operating for short periods of time and any error in measurement of the delta velocity will be damped out and eliminated by the tracking loop. For a small correction of $\Delta V$, the navigation system could function without the accelerometers at the expense of some temporary reduction of the precision of navigation whereas on a long term basis the precision would be unaffected.

The gyros which maintain the inertial reference must be trimmed periodically to compensate for their drift. This may be accomplished by either trimming the gyros themselves or affecting a coordinate transformation in the computer. By successive periodic stellar observation and adequate logic the gyros may be trimmed in space to eliminate all but the random drift. The gyro scale factor must also be determined in the case of a strapped-down inertial measuring unit in lieu of the gimbal angle measurement of the stable platform. In order to calibrate the scale factor in space it is necessary to measure the difference between position vectors of two known stars about the input axis of each of the gyros. The above-mentioned calibrations of the sensors is sufficient to erect the system in space and is dependent only upon never permitting the inertial reference to degrade beyond the field of view of the SAS.

Another embodiment of this invention, one in which a mathematical model of the orbit of the satellite is established using data obtained from on-board sensors, will now be described. The embodiment is based upon techniques used in the Model-Reference Adaptive Control System described by P. V. Osborne, "Investigation of a Method of Adaptive Control," M.I.T. Instrumentation Laboratory Report T–266, September 1961, and by P. V. Osborne, H. P. Whitaker and A. Kezer, "New Developments in the Design of Model Reference Adaptive Control Systems," Institute of Aeronautical Sciences, Paper 61–39, presented at the IAS 29th Annual Meeting, January, 1961. Reference may also be made to M. Margolis, "On the Theory of Process Adaptive Control Systems, The Learning Model Approach," USAF Office of Scientific Research, Report TN60–618, May 1960.

It is postulated that a satellite in orbit behaves in a predictable manner that is a function of the initial condition at any given time and the representation of the gravitational field of the planet. As such one can set up a mathematical model of the orbit which is a functional relationship whose constants, or parameters, may be determined and updated from time to time from on-board measurements. The model may be as simple or as complex as desired, and the complexity used will affect the accuracy of prediction of position at any given future time and will also place requirements upon the frequency with which the orbital parameters need to be updated. For example, a Keplerian ellipse can be fitted "instant by instant" to the initial conditions (position, velocity, angular momentum, etc.) This is perhaps the simplest model, but due to the nonspherical shape of the earth and perturbation forces, the prediction capability for a specified accuracy may be limited to a small portion of the orbit immediately ahead. More complicated models would include gravitational harmonics and the outputs of accelerometers or specific force sensors. A mathematic model for the orbit is provided whose inputs are the best indication available of the initial orbital parameters. The outputs of the model are then the indicated position, velocity, etc. at any future time. Depending upon the instrumentation available, various indications of the errors between actual and indicated orbital quantities can be obtained. This error information can be used to update the parameters of the orbital model automatically in a self-adaptive manner. One such measurement is the position indicated by the local vertical established by a horizon tracker.

The advantages to be gained from the use of the model stem from the fact that the orbit is a slowly changing determinable phenomenon. Thus smoothed data can be used to determine and update the orbital parameters. The output of the model is then a smooth quantity more accurate than the noisy position indication of the horizon tracker. The more accurate is the representation of the orbit by the model (inclusion of oblateness and atmospheric drag effects, for example), the less need there will be for updating the parameters, and very heavy smoothing can be employed.

The parameters can be adjusted by a process which minimizes the integral squared error $\int(\theta_t-\theta_H)^2 dt$. This in turn is accomplished by nulling each of the partial derivatives of the integral squared error with the adjustable parameters. These partial derivatives or error weighting functions can be expressed mathematically by straight forward differentiation of the equations representing the orbit. Since they only depend upon the error and the model being used, they can be computed by an on-board computer. By letting the change in a parameter be made proportional to its corresponding derivative, the model will converge to that representation of the orbit which minimizes the integral squared error. The rate of convergence will be a function of the proportionality constants used.

Shown in a functional form in FIGURE 4 is the space navigation system which utilizes the concept of updating orbital elements by use of adaptive control system techniques. FIGURE 4 is similar to FIGURE 1, with the position tracking loop 22 replaced with the satellite orbit adaptive model 80. The primary components of this space navigation system are those found in the steller-inertial guidance system previously described plus a horizon scanner 14′, and the navigation objectives are the same as those of the satellite guidance system. The inertial-measurement unit 12′ provides an inertial reference frame which is accurately updated periodically by use of star angle information obtained from the star-angle sensor 10′. The horizon scanner 14′ provides information on the indicated errors in the local vertical relative to its reference axis to the computer 16′ which uses these data along with data from the inertial measurement unit 12′ on inertial attitude and specific forces to determine vehicle position, orientation relative to the earth and vehicle control commands at 18′. In this way, the computer 16′ acts as the coordinating unit for the entire system in accomplishing the navigation, computation and control function of the guidance system. Only the navigation function of the system will be discussed here and a unique means of navigating for a satellite will be outlined. Within the computer 16′, shown in FIGURE 4, it may be seen that inertial attitude information from the IMU which is transformed at 20′, time from a clock 24′ and indicated errors in the local vertical relative to the horizon scanner 14′ axis are used by a satellite orbit adaptive model 80 to calculate attitude, position and control command data. This part of the computer function is the basis of this invention and represents a unique scheme for determining orbital position accurately using the data available from an inertial reference system 12′ and a horizon scanner 14′.

In FIGURE 5, a functional schematic of the satellite orbit adaptive model shows the means of applying adaptive techniques to determine orbital elements which are used. This mechanization could use any convenient set of orbital elements, and the ones to compute position used here are only for illustrative purposes. It should be noted here that the figures are functional and the actual computer design necessary to carry out the computations are not specified herein, but it is obvious that these computations may be performed with either analog or digital computation circuitry or a combination thereof depending on the mission requirements, and the mechanization of the computer necessary to perform the computations is apparent to those skilled in the art.

There are three basic steps necessary to compute position by adaptive means using the data available from the IMU and horizon scanner. These are calculation of orbital elements, computation of position using orbital elements and the generation of weighting functions for updating the orbital elements. These computations feed each other in a loop as shown in FIGURE 5 with external inputs entering the loop via the IMU and horizon scanner. For purposes of illustration a simple planar orbit model has been used in place of the more complex three-dimensional space. The geometry of the model is defined in FIGURE 6. The computations which must be done in the blocks shown in FIGURE 5 are outlined in functional form in FIGURES 7, 8 and 9. The planar orbital model presented is one of a satellite orbiting a planet with an inverse-square gravitational field. It is assumed that there are no other forces besides gravity acting upon the vehicle and therefore the orbit is in a fixed intertial plane. For these conditions and orbits with small eccentricity an adequate approximation for angular velocity is:

$$\dot{\theta}_c = r[1 + 2e \cos(\theta - \alpha)] \qquad \text{Equation 1}$$

This equation is mechanized in FIGURE 8. The integral-square error A in range angle is:

$$A = \int (\theta_c - \theta_t)^2 dt \qquad \text{Equation 2}$$

and the rate of change of the integral-square error with respect to an orbital element (eccentricity), for example) is:

$$\frac{\partial A}{\partial e} = \int 2(\theta_c - \theta_t) \frac{\partial \theta_c}{\partial e} dt = \int 2(\theta_c - \theta_t) W e dt$$

Equation 3

The above partial derivation should be driven to zero by the adaptive control loop, thus minimizing the integral-square error. A differential equation for $\partial \theta / \partial e$ can be found by differentiating the orbital angular velocity, Eq. 1, with respect to eccentricity and integrating with respect to time. This yields $$\frac{\partial \theta}{\partial e} = We = \int [2\Omega \cos(\theta - \alpha) - 2\Omega We \sin(\theta - \alpha)] dt$$

Equation 4

The above equation is mechanized in FIGURE 9 to yield We, the weighting function for ecentricity. The computation of the change in eccentricity, $\Delta e$, mechanized in FIGURE 7 in defined as:

$$\Delta e = K \int (\theta_c - \theta_t) We dt \qquad \text{Equation 5}$$

The equations for the adaptive loops for $\Omega$ and $\alpha$ are derived in a similar manner except that a weighting function of unity is adequate for adaptive corrections in the r loop.

By using the difference between the range angle measured by the horizon scanner and computed range angle $(\theta_t - \theta_c)$, the weighing factors $W_e$, $W_g$ and $W_r$ and the initial conditions, the operations shown in FIGURE 7 provide updated values for the orbital elements eccentricity $e$, mean motion $\Omega$, and argument of $(\gamma)$ perigee $\gamma$. Only simple mathematical operations are required to evaluate these elements.

The changes in the orbital elements are functions of the system errors and thus the adaptive feature of this system tends to drive the system error, in this case, the integral-square error to a minimum.

In FIGURE 8 the computations which are necessary to convert these orbital elements into an angular and radial position are shown. The calculation of range angle $\theta_c$ is done in a loop and represents the solution of a simple first order differential equation for the case which has been chosen for illustration, and from Keplerian equations of motion, the radius vector is derived. FIGURE 9 shows the generation of weighting functions of the orbital elements. The weighting functions for eccentricity and apsides angle as formulated in FIGURE 9 minimize the integral-square error in the computed range angle. The weighting function for the orbital velocity parameter need only be unity for correct orbit computation. The relationships set forth are approximate equations for orbits of low eccentricity ($e < 0.1$) however, the concept is general and may be formulated for highly eccentric orbits and for all orbital elements.

I claim:

1. In a space navigation system for an orbiting vehicle employing inertial sensors for producing vehicle orientation and acceleration signals, a stellar sensor for correcting said orientation signals, and a horizon sensor for producing a measured position signal of said vehicle in said orbit, the improvement comprising:

means responsive to said corrected orientation signals and said acceleration signals for producing signals corresponding to selected parameters of the orbit of said vehicle, means for generating from said selected orbital parameters signals a mathematical model simulating the orbit of said vehicle, means responsive to said mathematical model for generating a signal representative of the indicated position of said vehicle in said orbit, means for comparing said indicated and measured vehicle position signals and producing an error signal representative of the difference therebetween, and means responsive to said error signal for generating a correction signal corresponding to each orbital parameter and selectively feeding back said correction signals to said orbital parameters signals producing means to update said orbital parameters signals and drive said error signal to a minimum.

2. A space navigation system as in claim 1 in which said mathematical model comprises an equation of motion for a planar vehicle orbit about a spherical body.

3. A space navigation system as in claim 1 where said correction signal generating means comprises:

means for generating a first signal proportional to the integral of the square of said error signal, means for producing from said first signal selected partial derivative signals corresponding to each orbital parameter, and means responsive to said partial derivative signals for generating a correction signal for each orbital parameter.

4. A space navigation system as in claim 3 and including means responsive to said error signal for varying each said orbital parameter correction signal to thereby vary the sensitivity of said space navigation system.

5. A space navigation system as in claim 3 in which said selected orbital parameters are mean velocity, eccentricity, and argument of perigee.

6. A space navigation system as in claim 5 in which said horizon sensor produces a signal indicative of the local vertical between said vehicle and the body about which said vehicle is in orbit.

7. In a space navigation system for an orbiting vehicle comprising means for producing a signal representative of the vehicle motion, means for generating a signal representative of the orientation of said vehicle, means responsive to said motion signal and said orientation signal for producing signals corresponding to selected parameters of the orbit of said vehicle, means for generating from said selected orbital parameters signals a mathematical model simulating the orbit of said vehicle, a horizon sensor for sensing a source of signals having a known location external to said vehicle and producing a signal representative of the measured position of said vehicle, means responsive to said mathematical model for producing signals representative of the indicated position of said vehicle, means for comparing said indicated and measured position signals and producing an error signal which is indicative of the difference therebetween, and means responsive to said error signal for generating a correction signal and selectively feeding back said correction signal to said orbital parameters signals producing means to update said orbital parameters signals and drive said error signal to a minimum.

8. In a space navigation system for an orbiting vehicle comprising inertial sensor means connected to said vehicle for producing signals indicative of vehicle orientation and acceleration with respect to an inertial reference system, stellar sensor means having a sensor axis and producing a stellar signal indicative of the position of a stellar radiant body relative to said sensor axis, said sensor axis having a known orientation with respect to said inertial reference system, means for correcting said inertial sensor orientation signal with said stellar signal for producing a corrected orientation signal, a horizon sensor connected to said vehicle for sensing the local vertical of said vehicle and producing a vertical signal indicative of the orientation of said local vertical with respect to said inertial reference system, means responsive to said vertical signal and said corrected orientation signal for producing a first position signal indicative of the measured position of said vehicle, means responsive to said acceleration signals and said corrected orientation signals for producing signals corresponding to selected parameters of the orbit of said vehicle, a computer for generating from said selected orbital parameters signals a methematical model of the orbit of said vehicle defining the orbital path of said vehicle with respect to said inertial reference system, means responsive to said mathematical model for producing signals representative of the indicated position of said vehicle in said inertial reference system, means for comparing said indicated and measured position signals and producing an error signal indicative of the difference therebetween, means responsive to said error signal for producing a first signal proportional to the integral of the square of said error signal, and means responsive to said first signal for producing a correction signal for each of the said orbital parameters and feeding back said correction signal to said orbital parameters signals producing means.

References Cited

UNITED STATES PATENTS

| | | |
|---|---|---|
| 2,959,347 | 11/1960 | Kearns. |
| 3,230,351 | 1/1966 | Platt et al. _____ 235—150.2 |

RODNEY D. BENNETT, *Primary Examiner.*

BENJAMIN A. BORCHELT, *Examiner.*

M. F. HUBLER, *Assistant Examiner.*